Oct. 23, 1962  R. H. OWENS  3,059,522
RANGE FINDER HEIGHT COMPUTER
Filed June 15, 1959  2 Sheets-Sheet 1
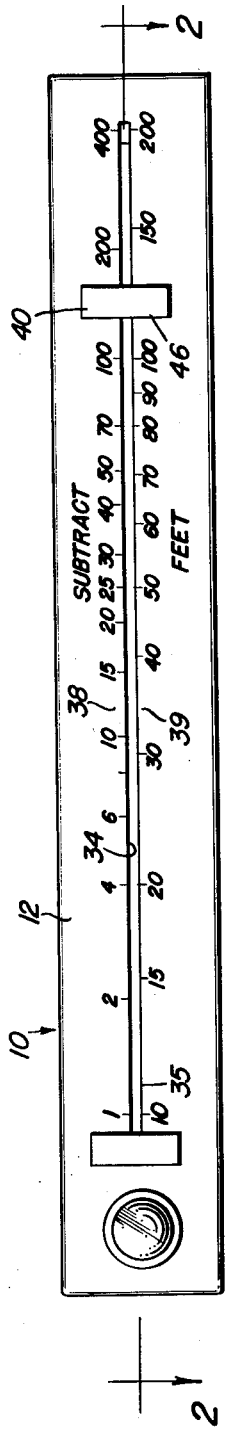
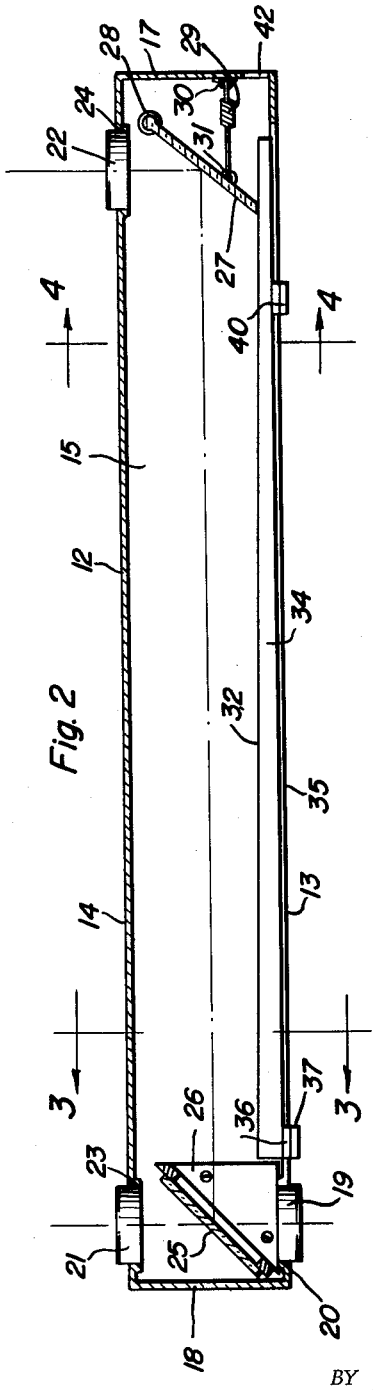
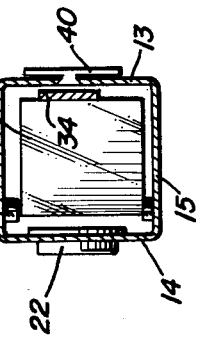
Rhea H. Owens
INVENTOR.

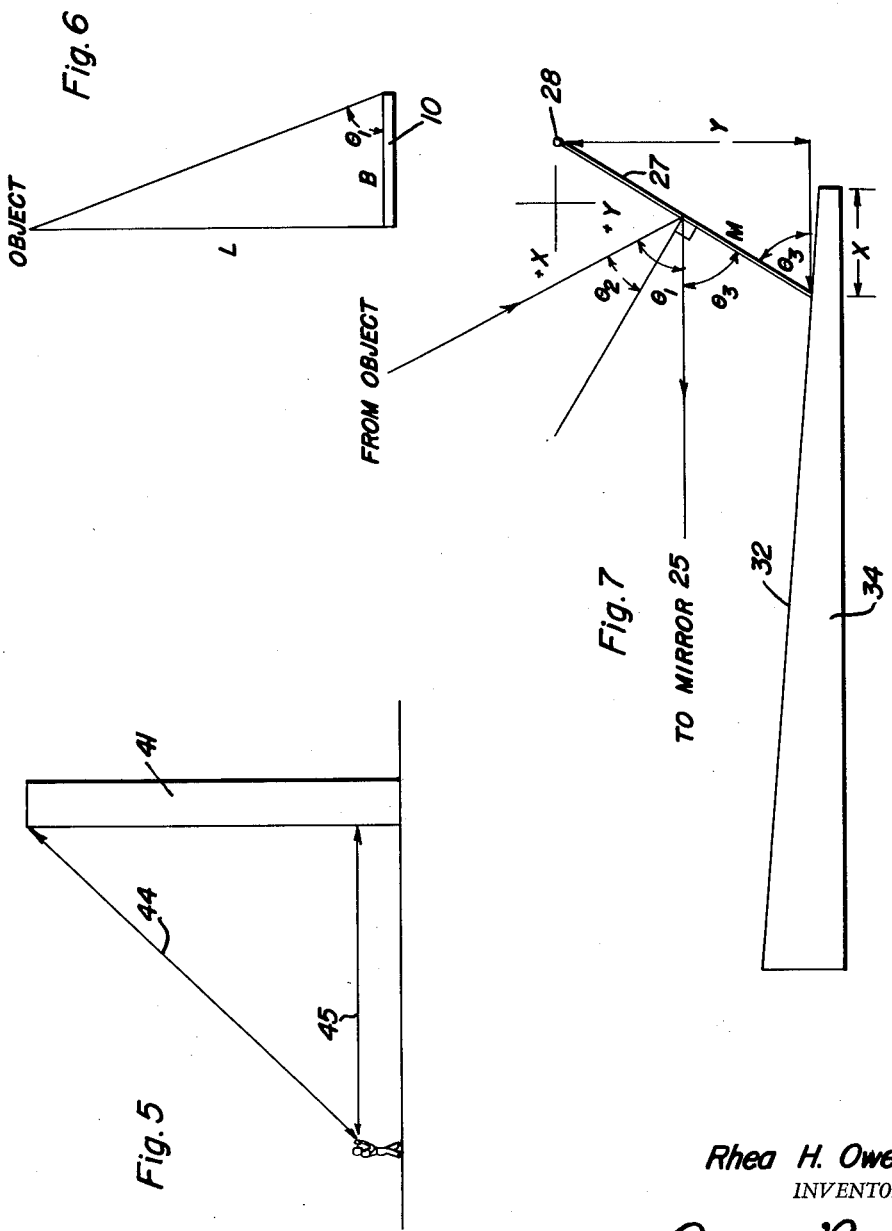

3,059,522
RANGE FINDER HEIGHT COMPUTER
Rhea H. Owens, 600 W. 10th St., Amarillo, Tex.
Filed June 15, 1959, Ser. No. 820,365
5 Claims. (Cl. 88—2.4)

This invention relates to a height computer suitable for measuring the height of any object within reasonable upper and lower limits, for instance from 10 to 200 feet high.

An object of the invention is to provide a mechanically and structurally simple height computer utilizing a coincidence type optical range finder and which is accurate and dependable.

Briefly, the height computer is composed of a light weight case which has an optical veiwing system arranged so that vision through an ocular produces a binocular effect in view of the presence of two objective lenses. A specially contoured cam is in the casing and adapted to move a part of the optical system, for instance one of the reflective mirrors thereof until the binocular effect disappears, at which point the pair of images merge into a single image. When this point is reached the computer is "reading" the distance to the object and the reading may be taken by inspecting the position of the cam, for instance as facilitated by a slider on the cam and a graduated scale with which the slider or an edge thereof coacts. This is but one example of a possible use of the computer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the computer.
FIGURE 2 is a longitudinal sectional view taken on the line 2—2 of FIGURE 1.
FIGURE 3 is a sectional view taken on the line 3—3 of FIGURE 2.
FIGURE 4 is a sectional view taken on the line 4—4 of FIGURE 2.
FIGURE 5 is a diagrammatic view showing a typical use of the computer.
FIGURE 6 is a further view showing the geometry in the use of the computer.
FIGURE 7 is a diagrammatic view further showing the geometry of the invention.

In the accompanying drawings there is a height computer 10 constructed in accordance with the invention. The height computer is made of a casing 12 which may have any configuration, one of which is generally rectangular and provided with a plurality of side walls 13, 14, 15 and 16, together with end walls 17 and 18. The casing is hollow and has an eye-piece 19 in an aperture 20 at one end of wall 13. Objective lens 21 and 22 are each mounted in apertures 23 and 24 near the ends of wall 14, and they have their axes parallel. A half-silvered mirror 25 is mounted on a suitable support, for instance bracket 26 in case 12 and is located on an axis common to the eye-piece or ocular 19 and lens 21. A full-silvered mirror 27 is mounted for swinging movement on hinge 28 which extends transversely across walls 15 and 16. There are resilient means opposing the hinged movement of the mirror 27 in one direction. These means consist of spring 29 which is attached by bracket 30 at one end to wall 17 and which is attached to an eye 31 on the back of mirror 27. The bias of the spring is in a direction which yieldingly maintains one edge of mirror 27 against the surface 32 of a specially constructed cam 34.

There is an elongate slot 35 in wall 13, and slider 36 which is fixed to cam 34, extends therethrough and has an enlarged part overlying the outer surface of wall 13. Edge 37 of slider 36 is used for read-out on distance reading scale 38 and calculating scale 39 whose graduations are adjacent to the edges of slot 35. A calculation slider 40 which is similar in construction to slider 36, is freely slidable but captive in slot 35. The edges of slider 40 coact with the graduations of scales 38 and 39 for read-out. As is seen from FIGURE 1 scales 38 and 39 are logarithmic to allow the instrument to be used in an offset mode of operation which shall be described subsequently. This requirement dictates that the cam 34 must be cut in a certain shape for each instrument that is of different design, although the same configuration of instrument will, of course, use the same cam shape.

The use and operation is mentioned at this time, and the cam construction will be described subsequently. However, it is to be clearly understood that the method of generating the cam surface is merely given as an example, and the cams from one instrument design to another will vary within the framework of the invention.

When an object 41 is viewed through the instrument, the path of vision is shown by means of the dotted lines. The object will appear double due to the objective lenses 21 and 22. However, as the cam 34 is slid by pushing slider 36, mirror 27 is adjusted in accordance with the shape of the cam surface 32. Practical design considerations require that the cam be extendable through opening 42 in wall 17, otherwise the instrument would be made longer than is necessary. There is a point of cam adjustment at which the two images merge and become a single image inasmuch as mirror 27 is adjusted against the yielding opposition of spring 29 in accordance with the movement of cam 34. At this point read-out may be achieved.

To measure the height of object 41 two separate techniques are possible.

(A) If standing close to the base of object 41, the top of the object may be viewed through the optical system of the computer and the cam slider 36 moved so that the two images merge. The height from the instrument to the top of object 41 may be read directly on the "feet" scale 39 as indicated by the edge 37 of slider 36.

(B) In offset use, two readings and a computation are made. Refer to FIGURE 5. A distance reading from the operator to the top of the object 41 is the first step. The slider 40 is then moved over until it touches edge 37 of slider 36. The slider is left in this position and the instrument is sighted at a point at eye level on the object 41 and the slider 36 moved to the left until the images merge. This yields information as to length 44 and in the second instance (moving slider 36 to the left) information as to length 45.

The value now indicated on the "subtract" scale which is scale 38, under the edge 37 of slider 36 is subtracted from the value on the subtract scale 38 under the edge 46 of slider 40. Slider 40 is then moved to this difference value on the subtract scale 38. The height of the object above the observer's eye level is read on the feet scale 39 as now indicated by slider 40 directly below the difference value on the subtract scale 38.

*Example*

Reading 44 is the numeral 25 on the subtract scale 38 (50 feet).
Reading 45 is 9 on subtract scale 38 (30 feet).
Difference is 16.
Slider 40 set to 16 on subtract scale 38.
Answer 40 feet read-out on the feet scale 39.

Calculation slider 40 serves to mark the position of the first reading and as a guide in determining the corresponding numbers on the subtract 38 and feet 39 scales respectively.

From the above described logarithmic scale arrangements it will be clear to anyone skilled in the art that the square of the hypotenuse ($\overline{44}^2$) may be logarithmically represented on scale 38, for example at a point $X_1 = 2 \log (\overline{44})$. Similarly the square of the triangular leg distance ($\overline{45}^2$) will be represented on the same scale 38 at a point $X_2 = 2 \log (\overline{45})$. Therefore the difference ($\overline{44}^2 - \overline{45}^2$) on the scale 38 will be represented by $X_3 = X_1 - X_2$, where $X_3 = 2 \log (\overline{41})$ since $\overline{41}^2 = \overline{44}^2 - \overline{45}^2$. The scale 39 is logarithmically arranged and aligned to read the square root of the values on scale 38 representing the actual distances $\overline{44}$, $\overline{45}$ and $\overline{41}$ rather than the squares thereof. Therefore upon determination of $X_3$ by subtracting on the scale 38 as above indicated the value $\overline{41}^2$ represented thereby on scale 38 may be read as $\overline{41}$ on scale 39.

Reference to FIGURES 6 and 7 show the cam design drawings and here again, it is further emphasized that these are by way of example only. The geometry is deemed self-evident to those skilled in the art. Cam 34 must have surface 32 of such shape that the angular relationships shown in FIGURE 7 will prevail following the adjustment of cam 34 such that the two images merge into a single image. Briefly, the following conditions satisfy the requirement of the instrument insofar as cam design is concerned:

$$\tan \theta_1 = \frac{L}{B}$$

$$\tan 2\theta_2 = \frac{L}{B}$$

$$\theta_2 = 90 - \theta_3$$

$$\tan 2(90 - \theta_3) = \frac{L}{B}$$

$$2(90 - \theta_3) = \tan^{-1} \frac{L}{B}$$

$$180 - 2\theta_3 = \tan^{-1} \frac{L}{B}$$

$$\theta_3 = \frac{180 - \tan^{-1} \frac{L}{B}}{2}$$

But $$y = m \sin \theta_3$$

$$y = m \sin \frac{90 - \frac{\tan^{-1} \frac{L}{B}}{2}}{}\qquad(1)$$

$x_m$ = Maximum useable length of cam
$L_{min}$ = Minimum distance to be measured
$L_{max}$ = Maximum distance to be measured For the necessary logarithmic scale:

$$x = \frac{\log L - \log L_{min.}}{\log L_{max.} - \log L_{min.}} (x_m) \qquad (2)$$

Whereby point $x$ is calibrated to read the distance L

By inserting values of L in equations 1 and 2, with design values of $m$, B, $L_{max}$, and $L_{min}$, values of $x$ and $y$ may be determined for cam curve and case calibration.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Object height determining apparatus for use with a range finder, including: a guide casing adapted to mount and house the sighting eyepiece and adjustable reflector of the range finder, said casing having an opening adjacent to said adjustable reflector through which an adjustment cam of the range finder may extend; a movable member slidably mounted in said casing and connected to said cam for adjustment thereof; a calculating member slidably mounted in said casing, scale means mounted on said casing adapted to be read by intersection thereof by the movable member and the calculating member; said cam being contoured for adjusting engagement with the adjustable reflector for optical focusing of the object points by the range finder in response to displacement of the movable member along a straight line, said scale means cooperating with the movable member to indicate both predetermined logarithmic functions of the distances and the actual distances of object points sighted from the range finder, said calculating member being slidable parallel to the movable members and independent thereof to convert calculated logarithmic functions of object height to actual height distances on the scale means.

2. An object height computer for an optical range finder having an angularly adjustable reflector for producing a merging image of an object point sighted through an eyepiece spaced from the adjustable reflector, comprising, slidably mounted cam means responsive to displacement thereof to displace said angularly adjustable reflector and having a cam surface in engagement with the reflector for displacing the reflector in a direction perpendicular to cam displacement as a sinusoidal function of the distance of a sighted object point from the eyepiece of the range finder, slider means connected to said cam means for displacement thereof, reading scale means intersecting said slider means and calibrated to directly indicate distance values of a sighted object point from the eyepiece corresponding to positions of the slider means relative to the reading scale means, calculating scale means intersecting said slider means and calibrated to indicate predetermined functions of the distance values read on the reading scale means by the slider means, and calculating slide means movably mounted independent of the cam means in intersecting relation to both of said scale means for transposing height computations calculated as said predetermined functions of distance values on the calculating scale means to the reading scale means for directing reading calculated height distances thereon derived from sighting vertically spaced object points.

3. The combination of claim 2, wherein said sinusoidal function is $$\sin m \left[ 90 - \frac{1}{2} \tan^{-1} (L/B) \right]$$

where $m$ equals the reflector length, L equals the distance of the object point from eyepiece and B equals the spacing between the eyepiece and the reflector.

4. The combination of claim 3, wherein said predetermined functions of distance values on the calculating scale means are logarithmic to permit simple calculation of differences between distance readings corresponding to sightings of said vertically spaced object points in order to obtain a reading of the vertical height distance between said vertically spaced object points by movement of the calculating slide means to a calculated difference value on the calculating scale means.

5. The combination of claim 2, wherein said predetermined functions of distance values on the calculating scale means are logarithmic to permit simple calculation of differences between distance readings corresponding to sightings of said vertically spaced object points in order to obtain a reading of the vertical height distance between said vertically spaced object points by movement of the calculating slide means to a calculated difference value on the calculating scale means.

References Cited in the file of this patent

UNITED STATES PATENTS

| | | |
|---|---|---|
| 1,294,341 | Jolly | Feb. 11, 1919 |
| 2,505,983 | Mills | May 2, 1950 |